No. 718,115.                                                                                  PATENTED JAN. 13, 1903.
A. FISCUS.
VEHICLE END GATE.
APPLICATION FILED NOV. 4, 1902.
NO MODEL.
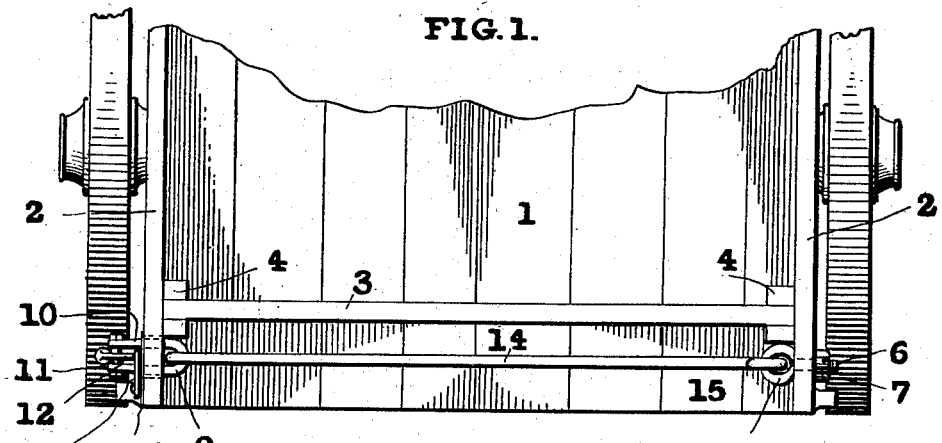
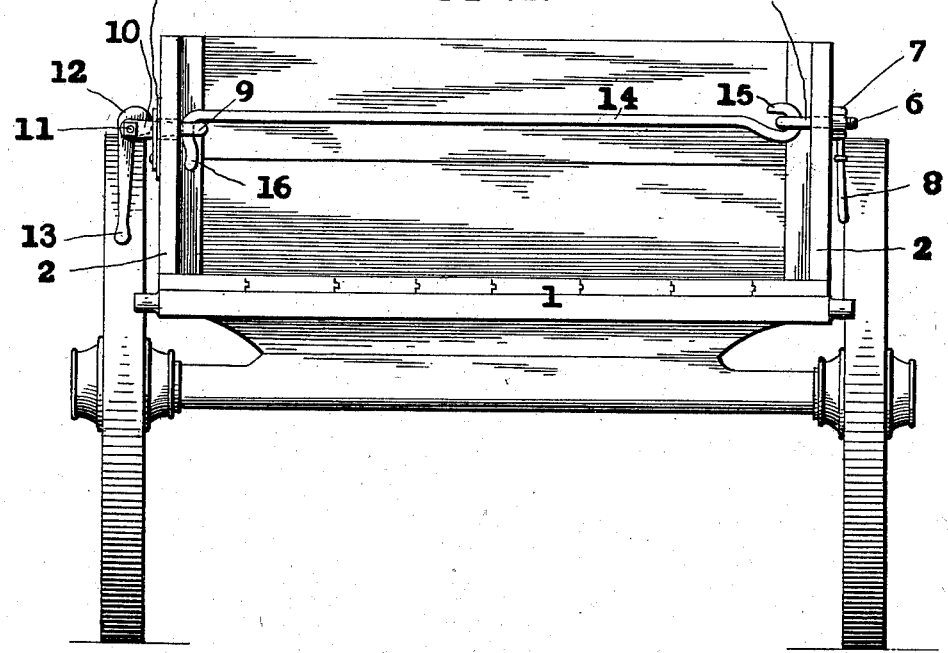

UNITED STATES PATENT OFFICE.

ADAM FISCUS, OF FISCUS, IOWA.

VEHICLE END-GATE.

SPECIFICATION forming part of Letters Patent No. 718,115, dated January 13, 1903.

Application filed November 4, 1902. Serial No. 130,106. (No model.)

*To all whom it may concern:*

Be it known that I, ADAM FISCUS, of Fiscus, county of Audubon, and State of Iowa, have invented certain new and useful Improvements in Vehicles; and I do hereby declare the following is a full and clear description thereof.

My invention relates to vehicles.

The object of my invention is to construct a wagon with a tail-board device or end-gate adapted to resist the outward pressure of the contents of the wagon.

The device is adapted to instantly lock the end-gate and support the sides of the vehicle and at the same time is capable of being instantly removed out of the way when loading and unloading.

With these objects in view my invention consists in the following construction and combination of parts, the details of which will first be described and the features of novelty then set forth and claimed.

Figure 1 represents a plan view of the rear portion of a wagon to which my improvements have been applied. Fig. 2 is an end elevation of the same.

In the drawings, 1 represents the wagon-body.

2 represents the sides.

3 is the end-gate, sliding in suitable ways 4.

5 is a staple secured to one side of the wagon, the shank 6 of which is screw-threaded and provided with a nut 7, having a handle 8 thereon, by means of which the eye is adjustable transversely of the wagon-body. On the opposite side of the wagon is another staple 9. The double shanks 10 project through the side of the body. The ends of these shanks are provided with a bolt or bearing 11, upon which, between the shanks, is mounted the cam or eccentric 12. This cam is provided with a lever-handle 13.

14 is a connecting-bar having a hook 15 at one end adapted to take into the eye 9.

When the lever-arm 13 is in a reverse position from that shown in Fig. 2, the eye 9 extends somewhat inwardly, in which position the hook 16 can be passed into the eye 9. By swinging the lever 13 substantially a half-revolution to the position shown in Fig. 2 the cam 12 is caused to engage the side of the wagon and force the eye 9 outwardly, thereby bringing the rod 14 under strain, supporting the sides of the wagon and locking the tail-board securely in place. A reverse movement unlocks the connecting-rod 14, upon which the hook 16 may be released from the eye 9 and the rod 14 thrown upwardly and out of the way upon the hook 15 and eye 5. The nuts 7 of the eye 5 aid in securing proper adjustment.

I may, if desired, substitute for the staple 9, to which the eccentric 12 is secured, an eye with a single shank instead of the double shank shown. To enable the staple 9 to be withdrawn and inserted from the outer side of the wagon or without it being necessary to detach the cam and lever, I may provide the wear-plate 16' with a movable plate 17, extending transversely across the staple-opening and against which the cam 12 bears in bringing the rod 14 under tension. The plate 17 may be moved across and away from the staple-opening by being connected with a pivoted arm 18 or in any other well-known way.

Having described my invention, what I claim as new, and desire to secure by Letters Patent, is—

In an end-gate for wagons, the combination of an eye provided with a shank and a screw-nut thereon locked on one side of the wagon, a staple passing through the opposite side of the wagon having an eccentric secured thereto for adjustably locking the same, a movable plate adapted to be adjustably set between the staple in contact with the eccentric, and a connecting-rod pivoted at one side of the wagon to the screw-eye, and having a hook adapted to enter the eye of the staple to which the eccentric is attached, substantially as shown and described.

In testimony whereof I have affixed my signature in the presence of two witnesses.

ADAM FISCUS.

Witnesses:
  MERT. FISCUS,
  EARL FISCUS.